J. THOMPSON.
Foot Stove.

No. 42,261. Patented April 5, 1864.

Witnesses
James P. Hall
Geo. W. Reed

Inventor
John Thompson

UNITED STATES PATENT OFFICE.

JOHN THOMPSON, OF BROOKLYN, NEW YORK, ASSIGNOR TO E. N. COLT, OF SAME PLACE.

IMPROVEMENT IN FOOT-STOVES.

Specification forming part of Letters Patent No. 42,261, dated April 5, 1864.

*To all whom it may concern:*

Be it known that I, JOHN THOMPSON, of Brooklyn, E. D., in the county of Kings and State of New York, have invented a new and Improved Warming-Pan; and I do hereby declare that the following is a full, clear, and exact description of the same, reference being had to the accompanying drawings, forming a part of this specification, in which—

Figure 1:
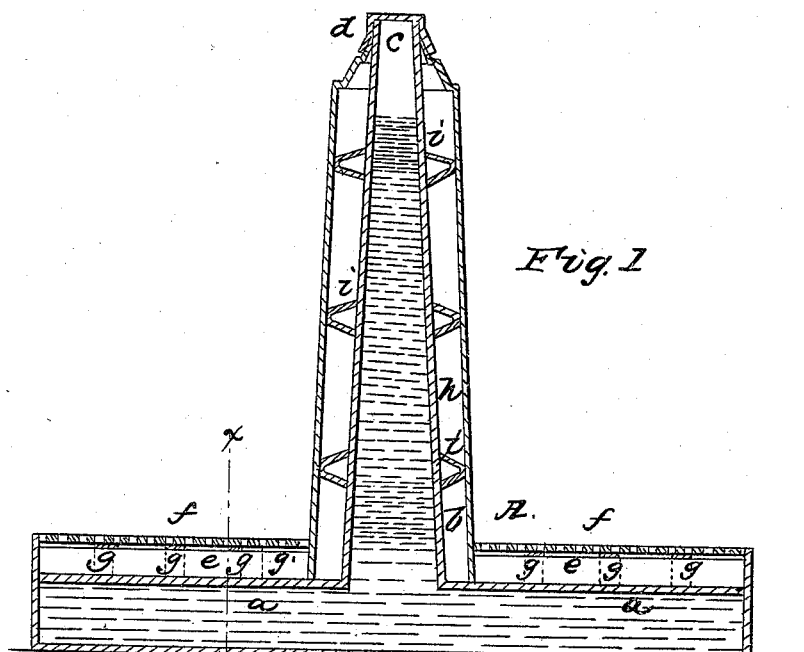
Figure 2:
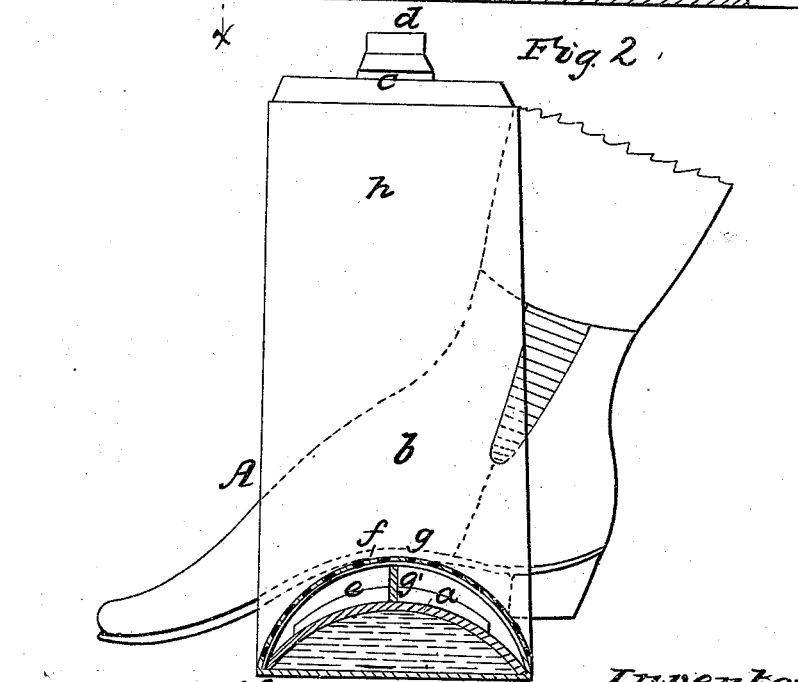

Figure 1 represents a longitudinal vertical section of my invention. Fig. 2 is a transverse vertical section of the same, the line $x$ $x$, Fig. 1, indicating the plane of section.

Similar letters of reference in both views indicate corresponding parts.

The invention consists in the application to a warming-pan of an air chamber, with perforated or solid sides, in such a manner that the feet or other parts of the body can be warmed without coming in direct contact with the surface of the pan.

The invention consists, also, in a warming-pan constructed in the shape of a T, so that in placing the feet on the two horizontal wings of the pan the vertical wing extends up between the legs, and the beneficial effect of the pan is extended over a larger portion of the body than with warming-pans of the usual construction.

To enable others skilled in the art to fully understand and construct my invention, I will proceed to describe it.

A represents a warming-pan, constructed of tin or any other suitable material, round, oval, square, or in any desired form or shape. It is made in the shape of the letter T, with two horizontal wings, $a$, and a vertical wing, $b$, and the vertical wing is provided with an opening or mouth, $c$, through which hot water can be introduced, and may be opened or closed by a screw-cap, $d$. The horizontal wings $a$ are made with a flat bottom and rounded top, as clearly shown in Fig. 2 of the drawings, and their top is covered by an air-chamber, $e$, formed by a perforated piece of sheet-metal, $f$, which is supported by the arched strips, $g$ and a longitudinal strip, $g'$. The feet can thus be placed on the surface of the pan and warmed without coming in direct contact with the heated surface of the body of said pan, which is of particular advantage when the pan is to be used in a bed where the bare feet are placed on it. The upright wing $b$ is surrounded by an air chamber, $h$, the sides of which are supported by strips $i$, as shown in Fig. 1. The sides of this air-chamber may be solid, so as to emit less heat than the perforated sides of the air-chamber $e$, because the legs with which it may come in contact cannot stand the same degree of heat as the bare feet.

It is obvious that an air-chamber similar to those above described may be applied to a warming-pan of any description, and I do not want to confine myself, therefore, to a pan of the precise form shown in the drawings. A T-shaped pan, however, has its peculiar advantages, because its effect is not limited to the feet alone, but extends up to the legs.

What I claim as new, and desire to secure by Letters Patent, is—

1. A T-shaped warming-pan, $a$ $b$, with or without air-chambers $e$ $h$, as set forth.

2. The combination of the horizontal air-chamber $e$ and vertical air chamber $h$ with the T-shaped reservoir $a$ $b$, substantially as specified.

JOHN THOMPSON.

Witnesses:
 J. W. COOMBS,
 GEO. W. REED.